C. S. LOCKWOOD.
RENEWABLE JOURNAL BEARING SLEEVE.
APPLICATION FILED MAY 19, 1909.
976,476.
Patented Nov. 22, 1910.
2 SHEETS—SHEET 2.
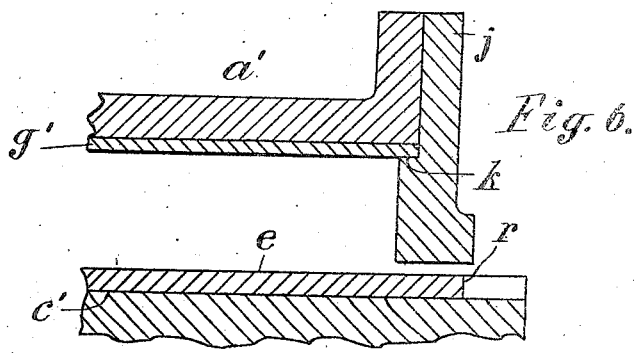
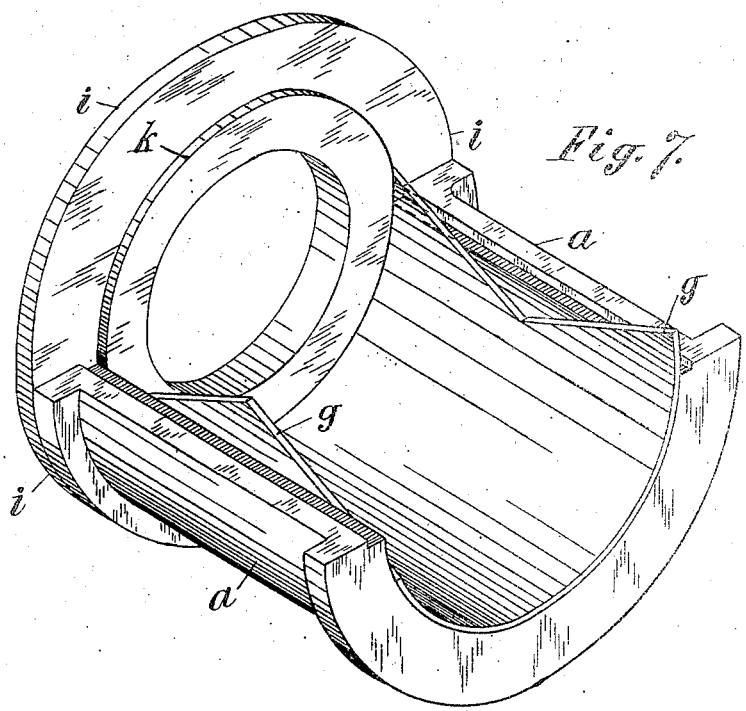
Witnesses:
L. Lee.
J. W. Greenbaum.
Inventor.
Charles S. Lockwood, per
Thomas S. Crane, Atty.

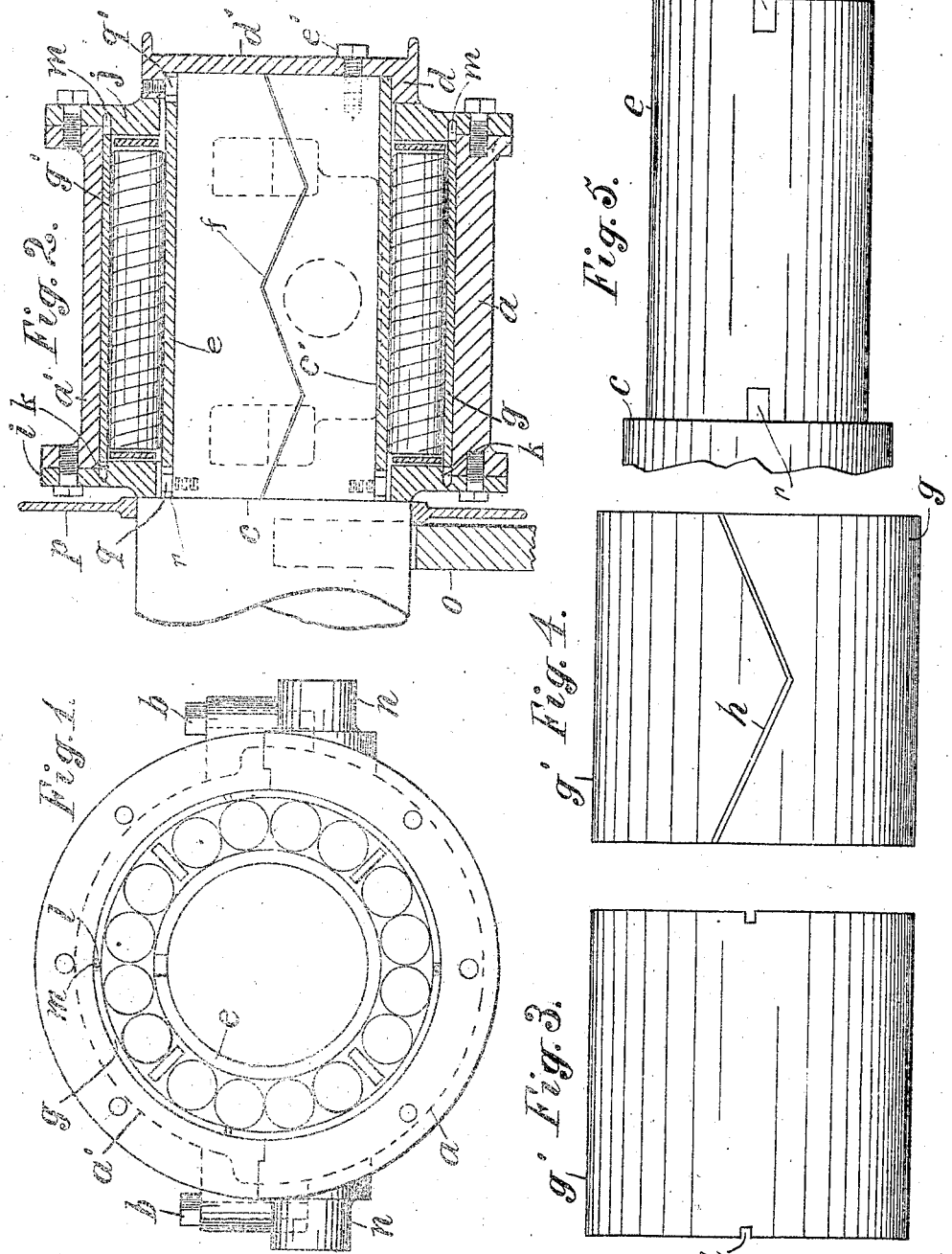

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

RENEWABLE JOURNAL-BEARING SLEEVE.

976,476.

Specification of Letters Patent. Patented Nov. 22, 1910.

Application filed May 19, 1909. Serial No. 497,089.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Renewable Journal - Bearing Sleeves, fully described and represented in the following specification and the accompanying drawings, forming a part of the same.

This invention furnishes a means of making the wearing-sleeve readily removable and renewable upon the journal of a shaft or within the casing of the roller-bearing, and relates especially to a bearing of considerable size, and to those having the sleeves made in sections, or several longitudinal parts.

The invention provides means by which the parts of the sleeve can be detached by lifting or sliding them clear of the cylindrical seat to which they are fitted. Such seat may be concave as upon the casing, or convex as upon the shaft.

In roller-bearings of large size, the linings for casings have often been secured permanently within the casing, as by means of rivets extended through the parts; and whenever the lining required renewal a great deal of labor was necessitated in chipping or punching out the rivets to remove the lining.

The present invention furnishes a means of inserting the parts of such a lining detachably in the casing and holding the said parts firmly in place while in use, but leaving them entirely free for removal and renewal whenever required. This is effected by dividing the lining longitudinally, and providing the casing with removable heads at its opposite ends, each having a ledge to extend within the ends of the casing, so that the ledges may bear upon the ends of the lining sleeve and hold the divided parts of the lining closely against the contiguous part. To prevent the sections of the lining from turning within the casing, their ends are provided with notches, and studs are projected from the heads into the notches. It is immaterial which of the parts is provided with the stud and which with the notch.

The lining sections may be removed from the casing by removing one of the heads and drawing the sections out longitudinally, or the casing itself may be divided longitudinally at the middle to form a cap upon the bearing, which, when opened, permits the upper half of the lining to be removed. The shaft is lifted from the bearing to remove the lower half of the lining. An analogous construction is employed to form the wearing-sleeve upon the journal, one or more studs being inserted in the journal at one end and the sleeve formed with open notch or notches to engage such stud or studs, and the sleeve held in place against such studs by a removable collar secured upon the shaft at the opposite end of the sleeve. To facilitate the application of such a sleeve to the journal while enabling it to fit closely upon the same, the sleeve is commonly divided at one side only giving it an elastic grip upon the journal, and the removable collar is preferably formed with a band to extend over and embrace one end of the journal-sleeve to hold the joint of the sleeve closed while it is in operation. Such band may be provided with a stud fitting in an open notch in the end of the journal-sleeve. With such attachments, the journal-sleeve is preferably extended within or beyond the heads at the ends of the roller-bearing, so that the notches do not extend into the wearing-surface traversed by the anti-friction rolls.

The invention will be understood by reference to the annexed drawing, in which—

Figure 1 shows the end of the roller-bearing with one of the heads removed; Fig. 2 is a side view of the same in section at the center line where hatched; Fig. 3 is a plan, and Fig. 4 a side view of the lining-sleeve for the casing; Fig. 5 is a plan of the journal with the sleeve thereon; Fig. 6 shows one corner of the journal upon a larger scale, and Fig. 7 is a perspective view of the outer bearing member with the cap of the casing and the upper half of its lining removed.

*a* designates the bottom of the casing and *a'* the top or cap of the same held detachably thereon by bolts *b*. The shaft is formed with a shoulder *c* at one end of the casing and a journal *c'* extended through the bearing to receive a collar *d* upon the opposite end. The journal is shown provided with a wearing-sleeve *e* divided longitudinally at one side upon the zigzag line *f*, and the casing is shown provided with the lining-sleeve formed with a bottom section $g$ and a top section $g'$, their joint being also formed upon oblique lines $h$ shown in Fig. 4, as is common. The casing is formed at opposite ends with detachable heads $i$ and $j$, and each is provided with an annular ledge $k$ extended within the lining, as is shown more clearly in Fig. 6, and operating, as shown in Fig. 2, to support the upper half of the lining independently of the cap $a'$. Each section of the lining is formed with notches $l$ in its opposite ends and studs $m$ are projected from the heads upon the periphery of the ledge to engage such notches, thus holding the lining sections from turning around the journal.

The construction illustrated is adapted for the bearing of the large drum-shaft in a beating-engine for making paper-pulp, such bearing being provided at opposite sides with pivots $n$, as shown in Figs. 1 and 2, and the beater-drum applied to the shaft close to the bearing next the wall of the tank, which wall is indicated by the lines $o$ in Fig. 2. As grease is liable to work out of the bearing on the side next the tank $o$, I provide an annular oil-guard $p$ upon the shaft at the end of the bearing, which projects outwardly from the shaft sufficiently to arrest all of such oil and throw it laterally. The shoulder $c$ upon the shaft furnishes an abutment for one end of the journal-sleeve $e$, and the sleeve is held against such abutment by the collar, having a band $d$, secured to the end of the shaft by plate $d'$ and bolt $e'$. The band $d$ projects over and embraces the end of the sleeve, thus holding the joint $f$ closed. The ends of the sleeve are provided with open notches $r$, and studs $q$ are inserted in the journal adjacent to the shoulder $c$ to engage such notches detachably. The band $d$ is shown with a stud $q'$ secured therein to engage a notch in the outer end of the sleeve, and both ends of the sleeve are thus positively driven with the shaft.

It will be observed that the band $d$ forms a ledge in contact with the outer side of the sleeve $e$ at its outer end, which ledge operates to hold the sleeve upon the journal in the same manner as the ledge $k$ holds the sleeve $g$ within the casing. The use of such ledges, and of the studs provided to hold the sleeves from turning, are a complete substitute for the rivets, screws or other permanent fastenings heretofore used for securing a sleeve to a journal or casing. The ledges and the studs form, however, a detachable engagement with the sleeves, and each of such ledges is attached or fixed to the part to which the sleeve is applied, so that the removal of the part which carries such ledge permits the removal of the sleeve from its seat. Thus, the journal which carries the sleeve $e$ also carries the collar having the ledge or band $d$ so that the removal of the collar $d$ permits the removal of the sleeve from the journal. In like manner, the heads $i$ and $j$ attached to the ends of the casing carry the ledges $k$ which hold the sleeve sections $g$, $g'$, within the casing, so that the removal of either head permits the withdrawal of the sleeve-sections from the casing.

It will be noticed that the end portions of the sleeve whether fitted to the journal or casing are projected beyond the ends of the rolls to receive the notches and the studs which hold the sleeve-sections from rotation, and such construction is preferable as not impairing the wearing-surface upon which the rolls travel.

I am aware that various fastenings have been used to retain a wearing sleeve in place, and my construction is therefore for the particular means which is claimed herein.

Having thus set forth the nature of the invention what is claimed herein is:

1. In a roller bearing, the combination, with the casing and shaft rotated therein, of a wearing-sleeve fitted removably to the shaft and provided with an open notch in its end, a shoulder upon the shaft at the end of the sleeve, a first stud in the shaft fitted detachably to the notch next such shoulder, a notch in the opposite end of the sleeve and a collar secured upon the shaft and provided with a second stud to fit such notch and operating to hold the sleeve against the shoulder in engagement with the first stud.

2. In a roller bearing, the combination, with the casing and shaft rotated within the same, of heads supported upon the casing and having an annular ledge projecting into the same and one or more sections of lining for the casing supported upon such ledge independent of the casing.

3. In a roller bearing, the combination, with the casing and shaft rotated within the same, of heads supported upon the casing and having an annular ledge projecting into the same, and one or more sections of lining for the casing supported upon such ledge, and means connected with at least one of the heads for holding each lining section in place.

4. In a roller bearing, the combination, with a casing and a shaft rotated therein and provided with a shoulder adjacent to the end of the casing and a stud in the journal adjacent to the shoulder, of a divided wearing-sleeve fitted to the journal of the shaft in contact with the shoulder and having an open notch fitted removably to the stud, and a collar fitted removably to the shaft at the opposite end of the sleeve and having a band to embrace the end of the divided sleeve.

5. In a roller bearing, the combination, with a casing and a shaft rotated therein and provided with a shoulder adjacent to the end of the casing and a stud in the journal adjacent to the shoulder, of a divided wearing-sleeve fitted to the journal of the shaft in contact with the shoulder and having an open notch fitted removably to the stud, the sleeve having also an open notch in the opposite end, and a collar fitted removably to the shaft at said opposite end and provided with a band to embrace the end of the sleeve and with a stud to removably engage the notch, whereby the sleeve can be drawn endwise from the journal when the collar is removed.

6. In a roller bearing, the combination, with a casing and a shaft rotated therein and provided with a shoulder adjacent to the end of the casing, of a divided wearing-sleeve fitted to the journal of the shaft in contact with the shoulder, and a collar fitted removably to the shaft at the opposite end of the sleeve and having a band to embrace the end of the divided sleeve.

In testimony whereof I have hereunto set my hand in the presence of two subscribing witnesses.

CHARLES S. LOCKWOOD.

Witnesses:
 ALFRED V. KOAUP,
 H. E. SAUL.